Figure 1:
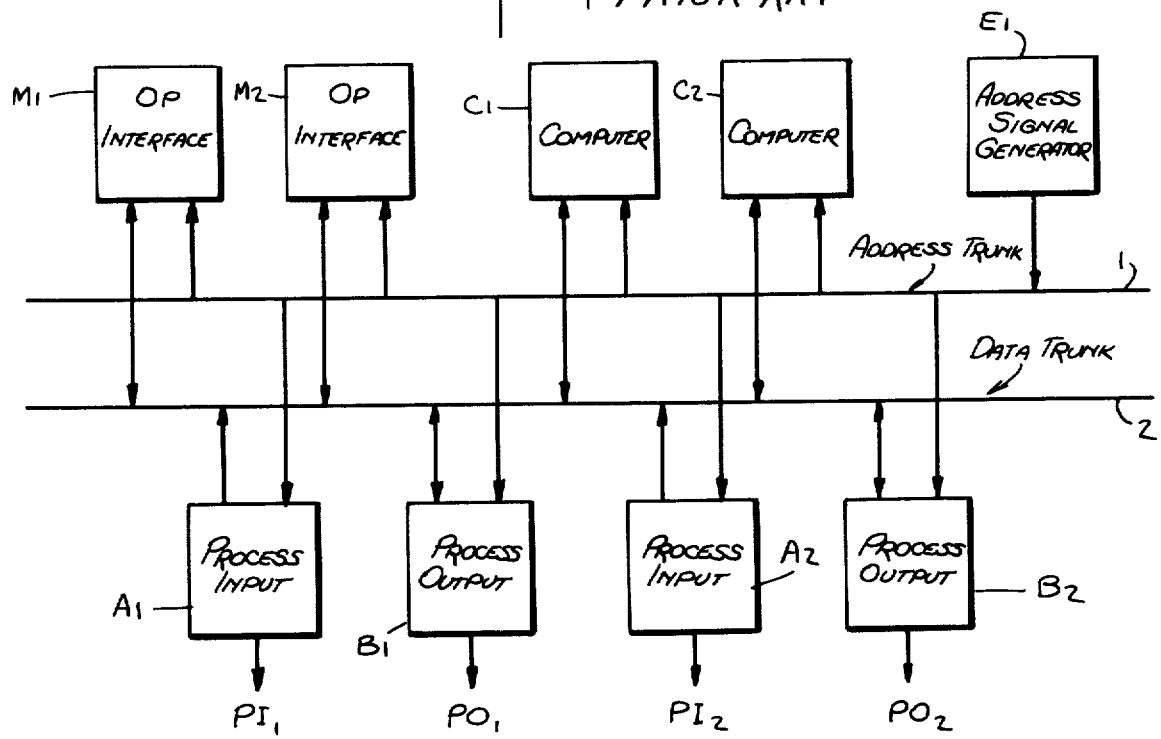

United States Patent [19]

Azegami

[11] 4,151,590

[45] Apr. 24, 1979

[54] PROCESS CONTROL SYSTEM

[75] Inventor: Tadashi Azegami, Inagi, Japan

[73] Assignee: Hokushin Electric Works, Ltd., Tokyo, Japan

[21] Appl. No.: 851,758

[22] Filed: Nov. 15, 1977

[51] Int. Cl.$^2$ .................. G06F 15/46; G05B 7/00
[52] U.S. Cl. .................. 364/115; 318/591; 364/101; 364/103; 364/117; 364/200
[58] Field of Search ........... 364/100, 101, 102, 103, 364/104, 114, 115, 119, 600, 602, 200 MS File, 900 MS File; 318/562, 590, 591; 340/147 R

[56] References Cited

U.S. PATENT DOCUMENTS

| | | | |
|---|---|---|---|
| 3,479,493 | 11/1969 | Jacques et al. | 364/114 |
| 3,526,757 | 9/1970 | Rees et al. | 318/562 X |
| 3,566,355 | 2/1971 | Smith | 364/114 X |
| 3,694,633 | 9/1972 | Lejon | 364/115 |
| 3,760,374 | 9/1973 | Nabi | 364/107 X |
| 3,987,351 | 10/1976 | Appelberg | 318/591 |

*Primary Examiner*—Joseph F. Ruggiero
*Attorney, Agent, or Firm*—Michael Ebert

[57] ABSTRACT

A process control system for multiplex operation of several process control loops. The system includes process input and process output units, analog and computer operation units and operator's interface stations, the exchange of process information between these units and stations being carried out by a time-sharing technique. The system is provided with a first data trunk through which process information through the data trunk is carried out in synchronism with address signals supplied to the address trunk in accordance with a cyclic control routine. Also included is a second data trunk which makes it possible at one's option to modify the cyclic control routine to select a desired mode of operation, the analog and computer operation units and the interface stations signalling whether operation in the manual control, analog control, or control mode is possible. State signals are generated at the operator's interface stations to the respective units to control their signal transmitting or receiving state.

3 Claims, 3 Drawing Figures

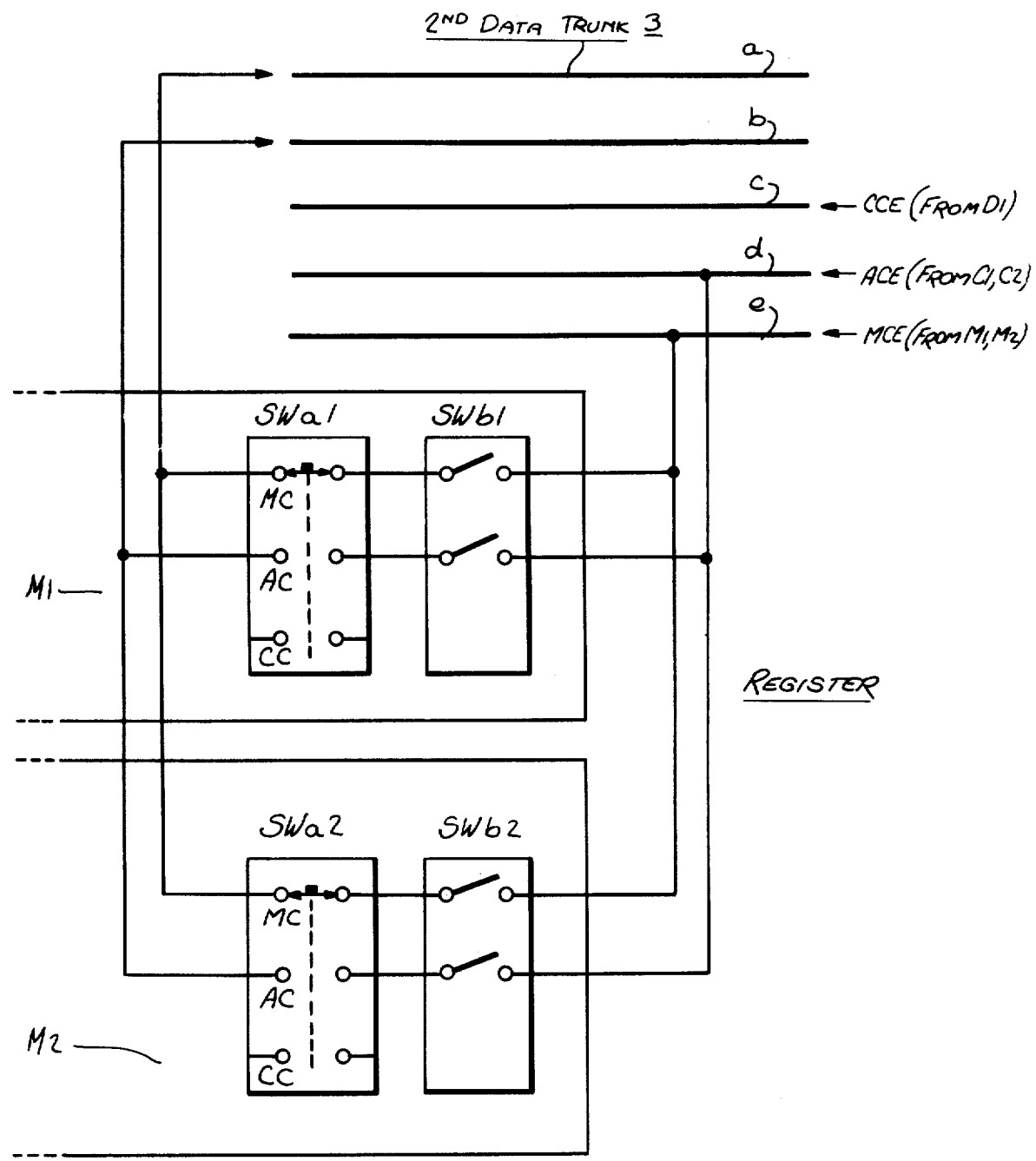

PROCESS CONTROL SYSTEM

BACKGROUND OF INVENTION

This invention relates generally to process control systems, and more particularly to a system in which a time-sharing technique is used to exchange process information between controllers or computers and process input and output units over a common data line.

Basic to the conventional process control system is an electronic controller, such as the PID type (Proportional, Integral, Derivative). In a process loop, this controller acts to compare a process input variable, such as flow rate or temperature as sensed by a transducer, with a set point value to derive a deviation signal that depends on the difference between these values. The controller operates on the deviation signal by a control action such as proportional or integral action. In adjusting this action, the objective is to produce an output signal that will govern a final control element, such as a valve, to minimize both the duration and magnitude of the deviation signal resulting from a process load change or a change in the set point.

In recent years, process control systems have been developed which include a multiplicity of process control loops, each having a process input unit, a process output unit and a controller. To obviate the need for complex wiring arrangements, the exchange of information between the input and output units and the controllers is effected over a common data line by a time-sharing technique.

In one known process control system of this type, the arrangement is such that each of the process control loops is arranged to operate in accordance with a signal exchange sequence which is in cyclic form for multiplexing, so that the process input fed into the process input unit is caused to coincide with a set point fixed by an operator at an interface station, the final control element in this loop being governed by the process control output supplied through a process output unit from a computing unit or controller.

With a conventional multiplex process control system of the type heretofore known, the signal exchange sequence is fixed and one cannot alter the control mode. Thus the cyclic control routine is inflexible and cannot be modified at the option of the operator.

SUMMARY OF INVENTION

In view of the foregoing, the main object of this invention is to provide a process control system which is more flexible than conventional systems, and whose functions are considerably expanded.

More particularly, it is an object of this invention to provide a system capable of directly controlling a process output unit at one's option; that is, to operate in a manual control mode on the basis of a control output from an operator's interface station, or to make use of analog PID controller in an analog mode or of a computer in a computer mode.

Briefly stated, a process control system for multiplex operation of several process control loops in accordance with the invention includes process input and process output units, analog and computer operation units and operator's interface stations, the exchange of information between these units and stations being carried out by a time-sharing technique.

The system includes a first data trunk composed of one or more lines through which process information is conveyed as well as an address trunk having one or more lines, the exchange of information being carried out in synchronism with address signals supplied to the address trunk in accordance with a cyclic control routine.

Also included is a second data trunk constituted by a group of lines through which state signals representing the state that each unit or station may offer is applied for each specific address. Register means operatively coupled to the second data trunk is adapted to select the state signals and to produce coding signals corresponding to the selection, which coding signals are applied to said units and stations. Included in the respective units and stations are decoding means responsive to said coding signals to control the signal transmitting or receiving state thereof.

OUTLINE OF DRAWINGS

Figure 2:
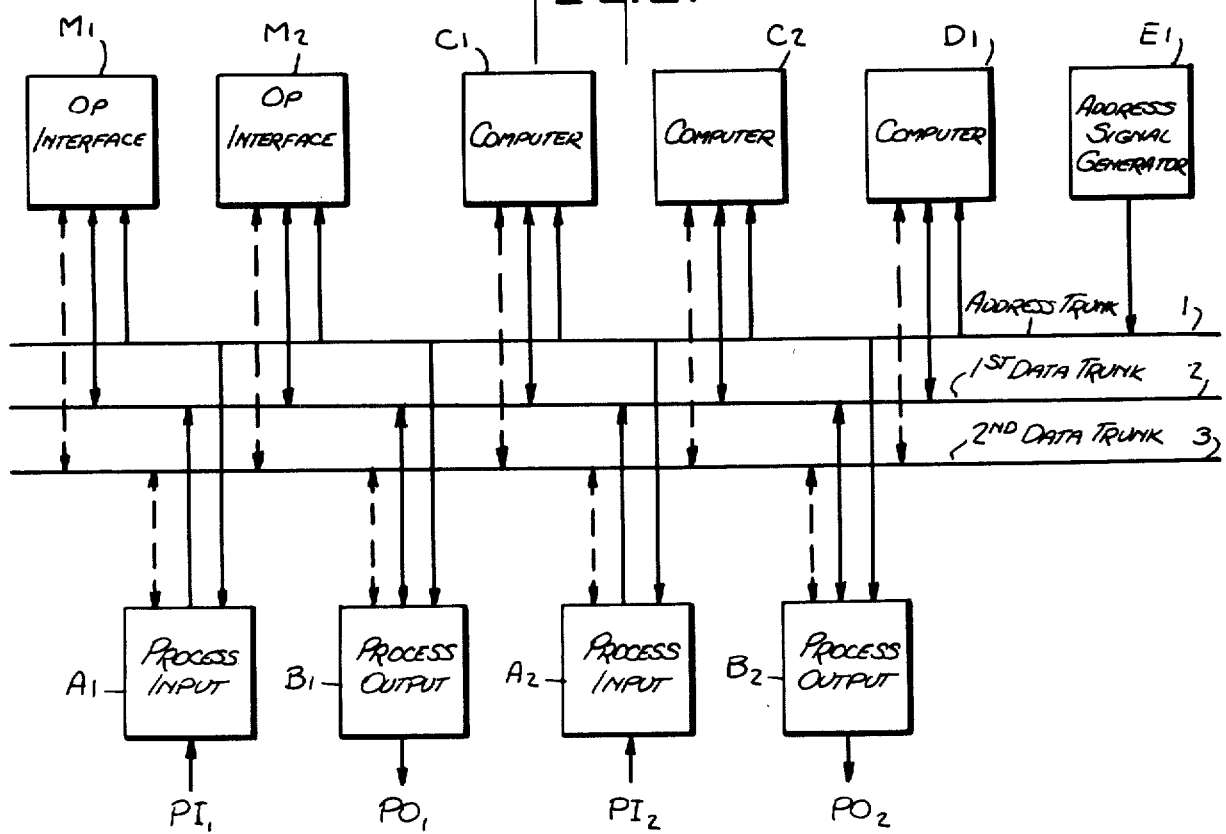

For a better understanding of the invention as well as other objects and further features thereof, reference is made to the following detailed description to be read in conjunction with the accompanying drawings, wherein:

FIG. 1 schematically shows a prior art form of process control system for multiplex operation of several process control loops;

FIG. 2 is a schematic diagram of a preferred embodiment of a process control system in accordance with the invention; and FIG. 3 schematically illustrates the second data trunk included in the first embodiment and the register means coupled thereto.

DESCRIPTION OF INVENTION

Prior Art

Referring now to FIG. 1, there is shown the arrangement of a known form of process control system utilizing a time-shared multiplex line which includes two sets of process control loops. More particularly, the known system comprises the following elements:

Address trunk 1
Data trunk 2
Cyclic address signal generator E1
Process input units A1 and A2
Process output units B1 and B2
Operator's interface stations M1 and M2
Computing units C1 and C2

With this arrangement, address signal generator E1 supplies address signals to address trunk 1, thereby controlling the functions of elements A1, A2, B1, B2, M1, M2, C1 and C2 in a manner whereby signal exchange among these units can be effected through the common data trunk 2 on a time-sharing basis. Each trunk may be constituted by one or more lines.

For example, the signal flow sequence through data trunk 2 is fixed for each address signal in accordance with the schedule set forth in Table No. 1:

Table No. 1

| Address (Binary Digit) | | | Signal.Flow Sequence |
|---|---|---|---|
| 0 | 0 | 0 | A1→C1, M1 |
| 0 | 0 | 1 | M1→C1 |
| 0 | 1 | 0 | C1→B1 |
| 0 | 1 | 1 | B1→M1 |
| 1 | 0 | 0 | A2→C2, M2 |
| 1 | 0 | 1 | M2→C2 |
| 1 | 1 | 0 | C2→B2 |
| 1 | 1 | 1 | B2→M2 |

When, therefore, the address is "000," the input supplied by process input unit A1 in the first control loop is indicated at the operator's interface station M1 and received by computing unit C1 where this process input is used to carry out the desired computation.

When the address is "001," some set point control value fixed by an operator at the operator's interface station M1 is transmitted to computing unit C1, thereby controlling a final control element, such as a control valve. When the address is "011," a process output held by process output unit B1 is fed back to the operator's interface station M1 whereby the process output value is indicated.

When the address is "100," a process input supplied by process input unit A2 in the second control loop is indicated at the operator's interface station M2 and received by computing unit C2 as a process input to be used to carry out a desired computation.

When the address is "101," a control set point fixed by an operator at operator's interface station M2 is conveyed to computing unit C2. When the address is "110," the value resulting from a computation carried out at computing unit C2 is transmitted to process output unit B2, thereby controlling a final control element in accordance with this value. And when the address is "111," the process output held by process output unit B2 is transmitted to the operator's interface station M2, whereby this process output value is indicated.

Thus the first control loop is arranged to operate in accordance with a signal exchange sequence which is in cyclic form for multiplexing, so that the process input $P1_1$ fed into process input unit A1 is caused to coincide with a set point fixed by an operator at interface station M1, the final control element in this loop being governed by the process control output $PO_1$ supplied through process output unit B1 from computing unit C1. The second loop which includes components A2, B2, C2 and M2 is arranged to function in a like manner.

With a conventional multiplex process control system of this type, since the signal exchange sequence is fixed, it is impossible to alter the control-mode at one's option, and the cyclic control routine is therefore inflexible.

The New System

Referring now to FIG. 2, there is shown a multiplex process control system in accordance with a preferred embodiment of the invention. In this system, symbols A1, A2, B1, B2, M1 and M2 designate components identical to those identified by these symbols in FIG. 1; hence no explanation as to the structure and function of these components is necessary. Elements C1 and C2 in this instance are analog computing units, while element D1 is a computer having a multiple point process input/output stage. All of the elements in this system are coupled to a second data trunk 3 as well as to the first data trunk 2.

Table no. 2 below indicates the information exchange sequence of these units and stations. It will be seen from this table that the functions carried out by addresses "010" and "110" are expanded as compared to those effected by the same addresses in the conventional system illustrated in FIG. 1.

Table No. 2

| Address | Manual Control Mode | Analog Control Mode | Computer Control Mode |
|---|---|---|---|
| 0 0 0 | A1→C1, M1, D1 | A1→C1, M1, D1 | A1→C1, M1, D1 |
| 0 0 1 | M1→C1, D1 | M1→C1, D1 | M1→C1, D1 |
| 0 1 0 | M1→B1 | C1→B1 | D1→B1 |
| 0 1 1 | B1→M1 | B1→M1 | B1→M1 |
| 1 0 0 | A2→C2, M2, D1 | A2→C2, M2, D1 | A2→C2, M2, D1 |
| 1 0 1 | M2→C2, D1 | M2→C2, D1 | M2→C2, D1 |
| 1 1 0 | M2→B2 | C2→B2 | D1→B2 |
| 1 1 1 | B2→M2 | B2→M2 | B2→M2 |

That is to say, when the addresses are other than "010" and "110," the system shown in FIG. 2 functions in the manner similar to that of FIG. 1 for the same addresses; but when the addresses are "010" and "110," a manual control mode, an analog control mode or a computer control mode may be selected in accordance with "state" signals carried by the second data trunk 3.

As shown in FIG. 3, second data trunk 3 is composed of a group of lines designated by letters a to e. Switches $SW_{a1}$ included in operator's interface station M1 and switches $SW_{a2}$ included in operator's interface station M2 serve to select the manual control mode at position MC, analog control mode at position AC and computer control mode at position CC. When the addresses are "010" or "110," switches $SW_{b1}$ included in operator's interface station ML, and switches $SW_{b2}$ included in operator's interface station M2 are closed.

Applied to line 3 from the operator's interface units MI and M2 is a signal MCE which signifies that manual control is possible when the addresses are "010" or "110." Transmitted on line d from analog computing elements C1 and C2 is a signal ACE signifying that analog control is possible when the addresses are "010" or "110." Transmitted on line c from computer D1 is a signal CCE, meaning that computer control is possible when the addresses are "010" or "110."

Lines a and e in data trunk 3 are connected through transfer switches $SW_{a1}$ and $SW_{b1}$ which are included in operator's interface station M1, these lines also being connected through transfer switches $SW_{a2}$ and $SW_{b2}$ included in operator's interface station M2.

With this arrangement, "state" signals produced by operation of the register are transmitted over data trunk 3. These signals are decoded by means of discriminators included in units C1, C2, D1, M1 and M2 to render the respective units operative in the transmitting or receiving state, as shown in table no. 3 below.

Table No. 3

| State | a | b | c | d | e | Operator's Interface Station | Analog Computing Unit | Computer |
|---|---|---|---|---|---|---|---|---|
| 1 | 1 | X | X | X | X | Transmitting | Receiving | Receiving |
| 2 | 0 | 1 | X | X | X | Receiving | Transmitting | Receiving |
| 3 | 0 | 0 | 1 | X | X | Receiving | Receiving | Transmitting |
| 4 | 0 | 0 | 0 | 1 | X | Receiving | Transmitting | Receiving |
| 5 | 0 | 0 | 0 | 0 | 1 | Transmitting | Receiving | Receiving | where X is 1 or 0.

Thus when one of the "state" signals on each data line a, b, c, d or e is 1, process output units B1 and B2 are controlled to receive the process control outputs on the first data trunk; but when one of the "state" signals on each data line a, b, c, d or e is 0, this signifies that none of the control signals is being offered, thereby halting renewal of the data.

As previously described, in the process control system in accordance with the invention, transfers switches $SW_{a1}$ and $SW_{a2}$ are normally switched to the CCE state, in that the state signal "01XX" of control state 3 is transmitted on lines a to e of second data trunk 3, whereby computer control is carried out.

If by any chance computer D1 should break down, it passes judgment as to its own condition and terminates transmission of the signal CCE, indicating that operation in the computer control mode is possible. Then the "state" signal on data lines a to e of second data trunk 3 becomes "0001X" which corresponds to control state 4 in table no. 3, so that the control mode automatically switches over to the analog control mode.

On the other hand, the control state can be changed to control state 1 or 2, shown in table no. 3, at the option of the operator by manipulating switches $SW_{a1}$ and $SW_{a2}$. That is, when these switches are set to position AC, the level on line b is made high ("1") such as in control state 2 in the same table, so that the control mode is switched over to analog control. Furthermore, when switches $SW_{a1}$ and $SW_{a2}$ are set to position MC, the level on line a is made high ("1") such as in control state 1 in the same table, so that the control mode is switched over to manual control from operator's interface stations M1 and M2.

Further in accordance with the invention, the process control system can function even when some of the units are withdrawn from the system for purposes of checking the units or for any other reason. When, for example, the operator's interface station is withdrawn from the process control system, even through the levels on lines a, b and c become low ("0"), since the level on line C is high ("1"), such as shown by control state 3 in table no. 3, computer control may be carried out in place of the previous state.

When both the operator's interface station and the computer are withdrawn from the control loop, since the level on line d then becomes high ("1"), such as shown by control state 4 in table no. 3, analog control is carried out in place of the previous state.

As will be evident from the foregoing, the intention that each unit has with regard to the information it has to offer may be reflected in the second data trunk 3 which is under cyclic control, and a sequence of operations may be carried out to realize the respective intentions of the units and stations. Thus the invention does not suffer from the drawback of a conventional system where the signal exchange sequence is fixed and inflexible and the function of a control loop is impaired should there be a disruption in this sequence.

While the foregoing explanation has been made in conjunction with an embodiment of the invention involving a process control signal exchange, the invention is also applicable to an arrangement which, in connection with set point control, a higher computer in a hierarchy computer system acts to control computer D by way of another digital data line as well. The invention may be applied to an arrangement in which the set point value is conveyed from computer D1 to analog computing units. The invention can also be applied to an arrangement in which the set point held by computer D1 is indicated at the operator's interface stations.

Moreover, though in the embodiment previously disclosed, process inputs are applied directly to computing units C1, C2 and D1 from process input units A1 and A2, if the process inputs represent, say, flow signals, these process inputs may be applied through a multiplier whereby pressure and/or temperature compensation can be effected.

One can also provide countermeasures in the event of a failure of the multiplier. For this purpose, two addresses T1 and T2 are allotted to the cyclic address sequence in order to transmit the process input to the first data trunk 2. In the case of address T1, the process input is transmitted from the process input unit to the multiplier to effect the desired compensation. With address T2, the compensated process value derived from the multiplier is transmitted to first data trunk 2, and the data on this trunk is received by the computing unit.

The arrangement is such that signal transmission in the period of address T2 is controlled so as to convey the process input when the multiplier breaks down. In the normal state, the compensated process value is transmitted from the multiplier; but when the multiplier fails, the multiplier judges this condition by itself and functions so that transmission to the second data trunk 3 is made low ("0"), at which level the process input from the process unit is transmitted directly to first data trunk 2. With this arrangement, process control continues without interruption although with a slight increase in measurement error.

While there has been shown and described a preferred embodiment of a process control system in accordance with the invention, it will be appreciated that many changes and modifications may be made therein without, however, departing from the essential spirit thereof.

We claim:

1. A process control system for multiplex operation of several process control loops, the system being provided with process input and process output units, analog controller and computer operation units, and operator's interface stations, the exchange of information between the units and stations being carried out on a time-sharing basis, the system comprising:
    (A) a first data trunk coupled to said units and stations to convey process information;
    (B) an address trunk coupled to said units and stations to which address signals are supplied in accordance with a cyclic control routine to synchronize the exchange of information through the first data trunk; and
    (C) means including a second data trunk having a group of lines making it possible, at one's option, to modify the cyclic control routine to select a desired mode of operation, said analog controller and computer operation units and said interface stations signalling whether operation in the manual, analog or computer state is possible, state signals being generated at the operator's interface stations to the respective units to control their transmitting or receiving state.

2. A system as set forth in claim 1, wherein said address signals are supplied to said address trunk by an address signal generator.

3. A system as set forth in claim 1, wherein said means includes a register operatively coupled to said second data trunk to select said state signals and to produce coding signals corresponding to the selection, the coding signals being applied to said units and stations and being decoded therein to control the transmitting and receiving states thereof.

* * * * *